United States Patent
Ahmed et al.

(10) Patent No.: US 8,792,341 B2
(45) Date of Patent: Jul. 29, 2014

(54) SYSTEM AND METHOD FOR MACHINE-TO-MACHINE APPLICATION BASED CONGESTION CONTROL

(75) Inventors: Hanan Ahmed, San Diego, CA (US); Vibhor Julka, San Diego, CA (US); Ronald Xuzhuang Mao, San Diego, CA (US); Limei Wang, San Diego, CA (US); Erik Colban, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 301 days.

(21) Appl. No.: 13/212,862

(22) Filed: Aug. 18, 2011

(65) Prior Publication Data
US 2012/0106329 A1   May 3, 2012

Related U.S. Application Data

(60) Provisional application No. 61/407,301, filed on Oct. 27, 2010.

(51) Int. Cl.
*H04W 4/00* (2009.01)

(52) U.S. Cl.
USPC ........... 370/230; 370/225; 370/228; 370/244; 370/245

(58) Field of Classification Search
USPC ....................................................... 370/230
See application file for complete search history.

(56) References Cited

U.S. PATENT DOCUMENTS

| | | | |
|---|---|---|---|
| 6,473,795 B1 * | 10/2002 | Danielson et al. | 709/224 |
| 6,728,211 B1 * | 4/2004 | Peris et al. | 370/235 |
| 7,154,995 B1 * | 12/2006 | Wilson et al. | 379/45 |
| 7,272,111 B2 * | 9/2007 | Zukerman et al. | 370/230 |
| 7,460,473 B1 * | 12/2008 | Kodama et al. | 370/230 |
| 7,746,887 B2 * | 6/2010 | McFarland | 370/455 |
| 7,760,639 B2 * | 7/2010 | Donovan et al. | 370/235 |
| 7,924,714 B2 * | 4/2011 | Muramoto et al. | 370/230 |

(Continued)

FOREIGN PATENT DOCUMENTS

| | | |
|---|---|---|
| CN | 101422019 A | 4/2009 |
| CN | 101645929 A | 2/2010 |

(Continued)

OTHER PUBLICATIONS

International Search Report, Applicant : Huawie Technologies Co., Ltd, et al., PCT/CN2011/079927, date of mailing: Dec. 1, 2011, 3 pages.

(Continued)

*Primary Examiner* — Ian N Moore
*Assistant Examiner* — Lakeram Jangbahadur
(74) *Attorney, Agent, or Firm* — Slater & Matsil, L.L.P.

(57) ABSTRACT

A method and apparatus for reporting events in a machine-to-machine environment are provided. Upon detection of an event, a determination is made whether to report the event with or without a delay. If the event is to be reported with a delay, then reporting is delayed for a period of time. If an event notification is received prior to the expiration of the delay period, then the reporting of the event may be canceled as event has already been reported by another element. If not, then another determination is made whether to report the event with or without another delay. This process continues until either the event has been reported or an event notification corresponding to the event has been received from another element.

15 Claims, 3 Drawing Sheets

(56) References Cited

U.S. PATENT DOCUMENTS

| | | | |
|---|---|---|---|
| 8,045,522 B2* | 10/2011 | Wang et al. ............... | 370/331 |
| 8,059,799 B1* | 11/2011 | Huntsman et al. ....... | 379/112.05 |
| 8,107,397 B1* | 1/2012 | Bagchi et al. ............. | 370/254 |
| 8,135,382 B1* | 3/2012 | Green et al. ............... | 455/406 |
| 8,185,629 B2* | 5/2012 | Hoeksel ..................... | 709/225 |
| 8,250,598 B2* | 8/2012 | Velazquez et al. ........ | 725/33 |
| 8,310,979 B2* | 11/2012 | Mason et al. .............. | 370/315 |
| 8,359,009 B2* | 1/2013 | Schroeder et al. ......... | 455/411 |
| 8,488,478 B1* | 7/2013 | Leytus ....................... | 370/252 |
| 2006/0002413 A1* | 1/2006 | Tsutazawa et al. ........ | 370/412 |
| 2006/0067219 A1* | 3/2006 | Dougall et al. ............ | 370/230 |
| 2008/0002676 A1* | 1/2008 | Wiley et al. ............... | 370/356 |
| 2008/0225872 A1* | 9/2008 | Collins et al. ............. | 370/412 |
| 2008/0285465 A1* | 11/2008 | Yang .......................... | 370/241 |
| 2008/0304629 A1* | 12/2008 | Buscemi et al. ........... | 379/45 |
| 2009/0290556 A1* | 11/2009 | Taaghol ..................... | 370/331 |
| 2010/0054207 A1* | 3/2010 | Gupta et al. ............... | 370/331 |
| 2010/0278042 A1* | 11/2010 | Monnes et al. ............ | 370/230 |
| 2011/0010654 A1* | 1/2011 | Raymond et al. .......... | 715/772 |
| 2011/0016199 A1* | 1/2011 | De Carlo et al. ........... | 709/220 |
| 2011/0182177 A1* | 7/2011 | Sedlacek et al. ........... | 370/230 |
| 2011/0188445 A1* | 8/2011 | Borleske et al. ........... | 370/315 |
| 2011/0269473 A1* | 11/2011 | Ronneke et al. ........... | 455/445 |
| 2011/0310731 A1* | 12/2011 | Park et al. .................. | 370/230 |
| 2012/0230302 A1* | 9/2012 | Calcev et al. .............. | 370/336 |

FOREIGN PATENT DOCUMENTS

| | | | | |
|---|---|---|---|---|
| EP | 0 585 479 A1 | | 3/1994 | |
| JP | 62185426 | | 8/1987 | |
| JP | 07327090 | | 12/1995 | |
| JP | 2005-021360 | * | 7/2003 | ............... A63F 7/02 |
| JP | 2005210360 A | | 8/2005 | |
| JP | 2007304702 | | 11/2007 | |
| JP | 200897603 | | 4/2008 | |
| JP | 2012520021 | | 8/2012 | |

OTHER PUBLICATIONS

"3$^{rd}$ Generation Partnership Project; Technical Specification Group Services and System Aspects; Access Class Barring and Overload Protection;" Release 7, 3GPP TR 23.898, Global System for Mobile Communications, Mar. 2005, 27 pages.

"Part 11: Wireless LAN Medium Access Control (MAC) and Physical Layer (PHY) Specifications," IEEE Std. 802.11-2007, Jun. 12, 2007, IEEE Computer Society, 1184 pages.

"Part 3: Carrier sense multiple access with Collision Detection (CSMA/CD) Access Method and Physical Layer Specifications," IEEE Std. 803.3-2008, Dec. 26, 2008, IEEE Computer Society, 671 pages (see eg., sections 1.1.2.1 and 4.2.2.4).

"Part 16: Air Interface for Broadband Wireless Access Systems," IEEE Std. 802.16-2009, May 29, 2009, IEEE Computer Society and the IEEE Microwave Theory and Techniques Society, 15 pages.

Mao, et al., "Wireless Broadband Architecture Supporting Advanced Metering Infrastructure," Feb. 2011, IEEE, 13 pages.

"ALOHAnet," retrieved from http://en.wikipedia.org/wiki/ALOHAnet, Oct. 19, 2011, pp. 1-8.

"Part 15.4: Wireless Medium Access Control (MAC) and Physical Layer (PHY) Specifications for Low-Rate Wireless Personal Area Networks (LR-WPANs)," IEEE Standard for Information technology—Telecommunications and Information exchange between systems—Local and metropolitan area networks—Specific requirements, IEEE Std 802.15.4, Oct. 1, 2003, 679 pages.

"Notice of Reasons for Rejection," Japanese Patent Application No. 2013-535254, mailing date: May 7, 2014, 6 pages.

* cited by examiner

SYSTEM AND METHOD FOR MACHINE-TO-MACHINE APPLICATION BASED CONGESTION CONTROL

This application claims the benefit of U.S. Provisional Application Ser. No. 61/407,301, filed on Oct. 27, 2010, entitled "Machine-to-Machine Application Based Congestion Control Scheme," which application is hereby incorporated herein by reference.

TECHNICAL FIELD

The present invention relates generally to a communications systems and methods, and, in particular embodiments, to a machine-to-machine application based congestion control scheme.

BACKGROUND

Machine-to-Machine (M2M) service refers to technologies that allow communication between devices (wireless or wired) through an access network, or between a device and a server that may be carried out without any human interaction. For example, M2M uses a device (such as a sensor or meter) to capture an event (such as temperature, inventory level, etc.), which is relayed through a network (wireless, wired or hybrid) to an application (software program) that translates the captured event into meaningful information (for example, items need to be restocked). Such communication was originally accomplished by having a remote network of machines relay information back to a central hub for analysis, which would then be rerouted into a system like a personal computer.

Modern M2M communication has expanded beyond a one-to-one connection and changed into a system of networks that transmits data to personal appliances. The expansion of wireless networks across the world has made it far easier for M2M communication to take place has lessened the amount of power and time necessary for information to be communicated between machines.

With support for M2M devices, however, there can be order of magnitude increase in number of devices supported by the network. While the majority of M2M devices may only report small amounts of data infrequently, the large numbers of M2M devices, such as Smart Meters (SMs), give rise to potential "traffic burst" scenarios that arise when large numbers of M2M devices report or react to a common event, such as a large number of SMs reporting a power outage, a large number of sensors reporting an earthquake, and the like. Regardless of the triggering event, such scenarios may lead to a large number of M2M devices simultaneously or near simultaneously trying to access the system to report the same event, thereby possibly degrading network performance.

SUMMARY

The embodiments of the present disclosure provide a system and a method for a machine-to-machine application based congestion control scheme.

In an embodiment, a method is provided, wherein the method comprises detecting an event, determining whether to queue reporting of the event, and if it is determined to queue the event, waiting for a time period. After the time period expires, the determining is repeated.

In another embodiment, a method comprising: detecting an event and determining a random number is provided. The random number is used to determine a time period to delay. After delaying, a determination whether an event notification has been received is made, and if not, an event report corresponding to the event is sent.

In yet another embodiment, a system is provided. The system comprises an event detector to detect an occurrence of an event and a random number generator coupled to the event detector, the random number generator providing a random number. A comparator is coupled to the random number generator, such that the comparator determines whether the provided random number is above a threshold. An event report transmitter is coupled to the comparator, such that the event report transmitter sends an event report corresponding to the event, and a delay unit is coupled to the comparator to delay further processing of the event for a time period. A notification receiver is coupled to the delay unit to receive an event notification from another system, the event notification corresponding to the event.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in details below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

In one aspect, the present disclosure provides a new application layer based congestion control scheme. Embodiments avoid or reduce transmission of redundant non-critical information by staggering of the information transmitted by the M2M devices. In addition, the M2M device can discard the queued information once it determines that the information is no longer needed.

In one embodiment, the system provides an application layer based congestion control scheme. This embodiment scheme may proactively avoid transmission of redundant non-critical information by staggering the information generated by the M2M devices. In addition, the M2M device may discard the queued information once it determines that the information is no longer pertinent, for example, when it is detected that another M2M device has already transmitted the information.

Figure 1:
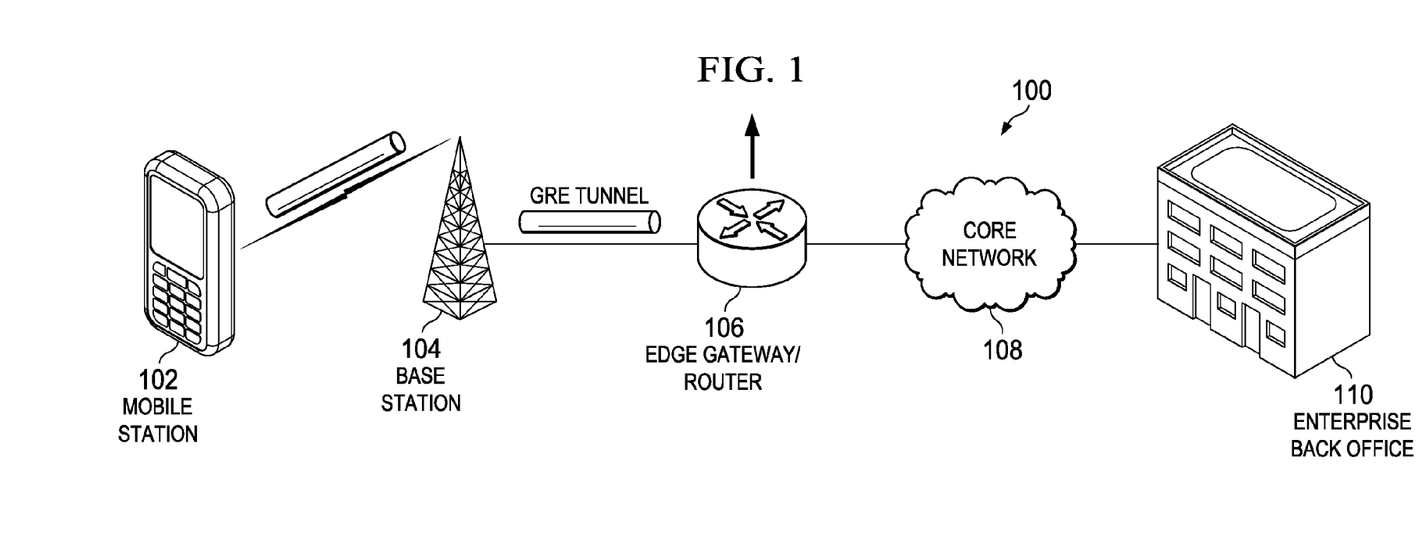
FIG. 1 illustrates a model of a network that can utilize aspects of the present disclosure.

FIG. 1 illustrates a simplified example of a network 100 that can utilize aspects of the present disclosure. A mobile station (MS) 102, which may represent an M2M device communicating via a wireless transmission protocol, is in communication with a base station (BS) 104. While only one MS 102 and BS 104 are shown, it is understood that a large number of devices can be in communication simultaneously. The base station 104 in turn communicates with an edge gateway or router 106, for example, via a GRE (generic routing encapsulation) tunnel. The edge gateway/router 106 is coupled to the core network 108. Communications can be transferred via this network to an enterprise back office 110 or whatever other destination is intended for the communications.

As noted above, the large numbers of M2M devices, such as Smart Meters (SMs), give rise to potential "traffic burst" scenarios that arise when large numbers of devices report or react to a common event. To deal with this congestion (for example, eliminate unnecessary traffic and allow only emergency related calls to proceed) some wireless technologies incorporate some means of access prioritization over the air by specifying Access Classes (AC). A device is assigned one or more AC and the network limits access attempts by broadcasting a barred Access Class list. If the device AC is a member of the barred Access Class list, the device may not attempt to connect to the network. Upon detection of congestion or a priori knowledge of a potential traffic burst trigger, the network can suitably update the barred Access Class list to abate the congestion.

One drawback with this AC approach is that the network may not be aware or may not react in time to the network congestion and cannot update the barred Access Class list in time. This implies that the large numbers of M2M devices will continue to attempt to access the network and contribute to the overload condition. Embodiments such as those discussed herein may reduce or prevent this problem by staggering transmission of the information by the M2M devices (e.g., SMs, MSs, or the like), thereby reducing transmission of redundant, non-critical information. In addition, the M2M device may discard the queued information if it determines that the information is no longer pertinent.

It should be noted that FIG. 1 illustrates a wireless network system for illustrative purposes only. In other embodiments, the M2M devices communicate via a wired communications system. Furthermore, the network may comprise both wireless M2M devices and wired M2M devices.

Figure 2:
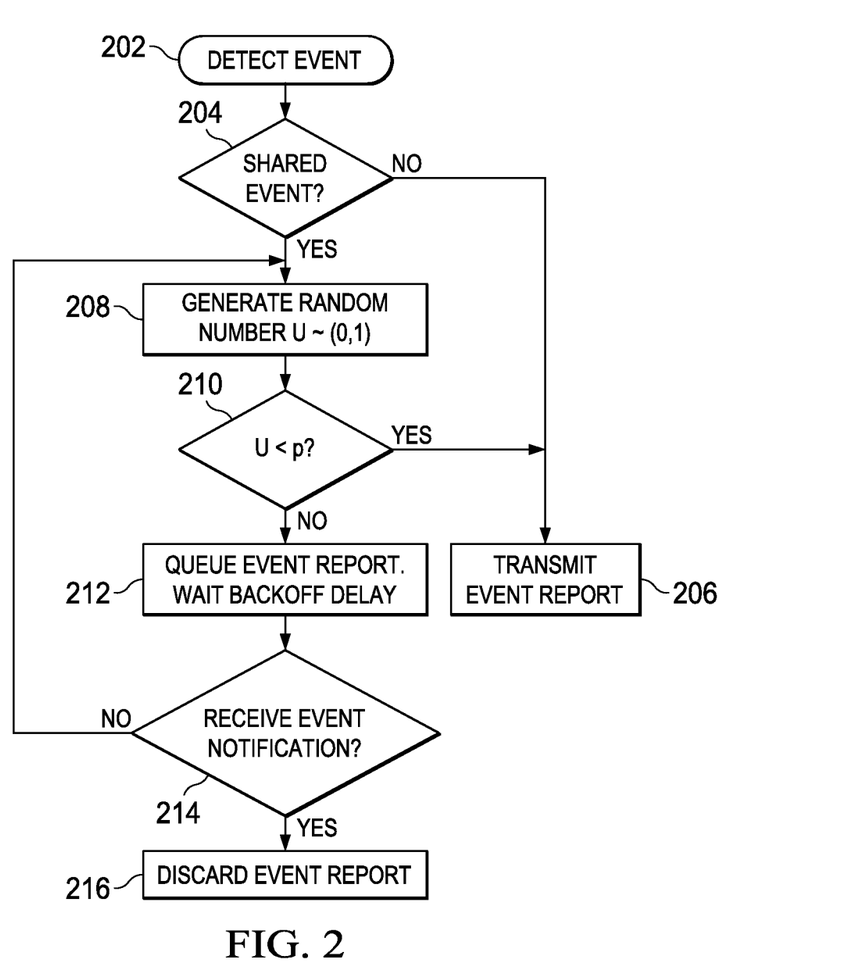
FIG. 2 is a flow chart illustrating steps in a first embodiment.

FIG. 2 illustrates a process for controlling reporting of events in accordance with an embodiment. Generally, the process avoids transmission of redundant non-critical information by staggering transmission of the event reporting by the M2M device. In addition, the M2M device may discard the event report that have yet to be reported by the M2M device if it is determined that the event report is no longer pertinent, such as may be the case if the event has already been reported by another device in the network.

Referring first to step 202, an event is detected. The event may be, for example, a power outage, inclement weather, an earthquake, hardware failure, software failure, or any number of other events that the knowledge of an occurrence of the event is desirable to another network device. It should be noted that these examples are provided for illustrative purposes only and are not meant to limit the claims.

Upon detection of an event in step 202, processing proceeds to step 204, wherein it is determined whether or not the event is a shared event or a local event. Shared events are events that may be reported by two or more M2M devices remotely located. For example, a power outage, inclement weather, or an earthquake may affect a large area and, hence, may affect multiple M2M devices over a large area. Other events may be local in that the event affects a particular M2M device or a relatively few number of M2M devices that are located within a region. For example, a local event may include a faulty battery backup, low disk storage, and/or the like that may affect a single M2M device. In another example, a local event may be a house fire that may be reported by two or more M2M devices located within or near the house.

Because local events are typically reported only by that particular M2M device, and hence may not unnecessarily burden the network, upon determining in step 204 that the event is a local event, processing proceeds to step 206, wherein an event report corresponding to the local event is transmitted (wired, wirelessly, or hybrid). It should be noted that the events may be system level events, region specific, device type specific, application specific, a combination of those, etc.

If, on the other hand, a determination is made that the event is a shared event (e.g., events that may be detected by multiple M2M devices), processing proceeds to steps 208-216, wherein the duplication of reporting of shared events by each affected M2M device may be reduced or prevented. Initially, in steps 208 and 210 a decision is made whether to delay reporting of the event (with probability 1-p) or to report the event without a delay (with probability p). In an embodiment, such as that illustrated in FIG. 2, the decision comprises comparing a random number to a threshold. For example, step 208 illustrates generating a random number between, for example, 0 and 1. The random number may be determined by any suitable technique, such as being based on a system clock, thermal characteristics, noise levels, movement, and the like. It is understood that a random number includes a pseudo-random number.

In step 210, the random number is compared to a threshold or probability. In this embodiment, if the random number is less than the threshold, then processing proceeds to step 206 wherein an event report corresponding to the event is transmitted without any further backoff delay. Otherwise, processing proceeds to step 212 wherein a backoff delay is performed. In this example embodiment the random number generates numbers that are uniformly distributed on the interval $[0, 1]$. Because the random number, theoretically or practically, has an equal probability of being equal to all values between 0 and 1, the threshold represents a probability that the random number is below or above the threshold. For example, a threshold of 0.5 represents an equal probability that the event will be reported and that reporting of the event will be delayed. Similarly, a threshold of 0.3 represents a 30% probability that the event will be reported without any further backoff delay and 70% probability that reporting of the event by this particular M2M device will be delayed.

The threshold or probability may be the same for all events, or may be specific to the event, or may be specific to the type or category of events. The threshold or probability may also be based upon the number of devices that share the event. For example, an event that is shared by many devices may have a threshold set lower than an event shared by only a few devices. The threshold or probability may also be based upon the criticality of the event. For example, if an event is considered a critical event, then the threshold may be set high, thereby increasing the likelihood that the event will be reported sooner even though it may result in an increase in network traffic. Conversely, a non-critical event may have a lower threshold, thereby increasing the probability that the event report will be delayed. Furthermore, the probabilities for each event or type of event may be individually controlled and the probabilities for each M2M device may be individually controlled. Furthermore, the threshold or probability may be adjusted based upon the result of the transmission, e.g., how many times the transmission has been delayed. In an embodiment, it may be desirable to allow the update and control of the probabilities via a network interface, thereby allowing the probabilities to be set from a remote device, such as a centrally located system administrator.

In step 212, the system waits for a backoff delay period. Similar to the probabilities, the backoff delay may be a global/default delay period or may be specified for individual events or types of events. The backoff delay may also be adjusted based upon the result of transmission, e.g., how many times the transmission has been delayed. Generally, the backoff delay period delays reporting of the event, waiting to see if another device, such as another M2M device, reports the event. Accordingly, the M2M device continues to monitor communications to listen for an event notification corresponding to the event to be reported. The value of the backoff delay may be a predetermined value, randomly generated, determined by a network command, or the like. This allows critical shared events, such as an external security alarm detecting a neighbor's car/burglar alarm and alerting E-911, to be given a shorter backoff delay as compared to a non-critical shared or local event.

In step 214, a determination is made whether or not an event notification corresponding to the event has been received from another device, such as another M2M device, a base station, a server, an M2M server, or the like. The event notification may be sent by the other device using any suitable protocol, including unicast, multicast, and broadcast messaging. If a determination is made that an event notification corresponding to the event has been received, then there is no need to report the event and the queued event report is discarded as illustrated in step 216.

In another embodiment, a network command may be sent instead of or in addition to the event notification to cause the M2M device to cancel reporting of the event. The network command may be, for example, to set the threshold or probability to 0, which would signal the M2M device that the event report is not to be sent. Other network commands, such as an explicit message to cancel the reporting, may also be used. In an embodiment, the command to set the probability to 0 may be included in the event notification message received from another device, such as another M2M device, a base station, a server, an M2M server, or the like, and may be sent using any suitable protocol, including unicast, multicast, and broadcast messaging.

The event report and/or event notification may be a specific message or a broadcasted message. Some communications systems, such as WiMAX support application layer based broadcasting/multicasting. In systems such as these, the event report/notification messages, as well as probability commands, backoff delay commands and/or the like, may be communicated to the M2M devices via a unicast, multicast, and/or a broadcast message.

Otherwise, if a determination is made that an event notification corresponding to the event has not been received by the expiration of the backoff delay period, then processing returns to step 208.

It should be noted that the method provided above is but one example of an embodiment for illustrative purposes to demonstrate the concepts and that other embodiments may utilize a different process. For example, in another embodiment, a determination of whether an event is a shared event or a local event step 204 may be combined with steps 208 and 210. As discussed above, each event or category of event may have its own probability or threshold. Local events may be given a probability or threshold of 1, thereby indicating the local event is to be reported without delay. An example of a local high priority event might be that a house is on fire and the system should not wait for neighbors to detect and notify the authorities. In this case, if the event for a house fire is given a probability of 1, then that event would be reported immediately without a backoff delay.

Figure 3:
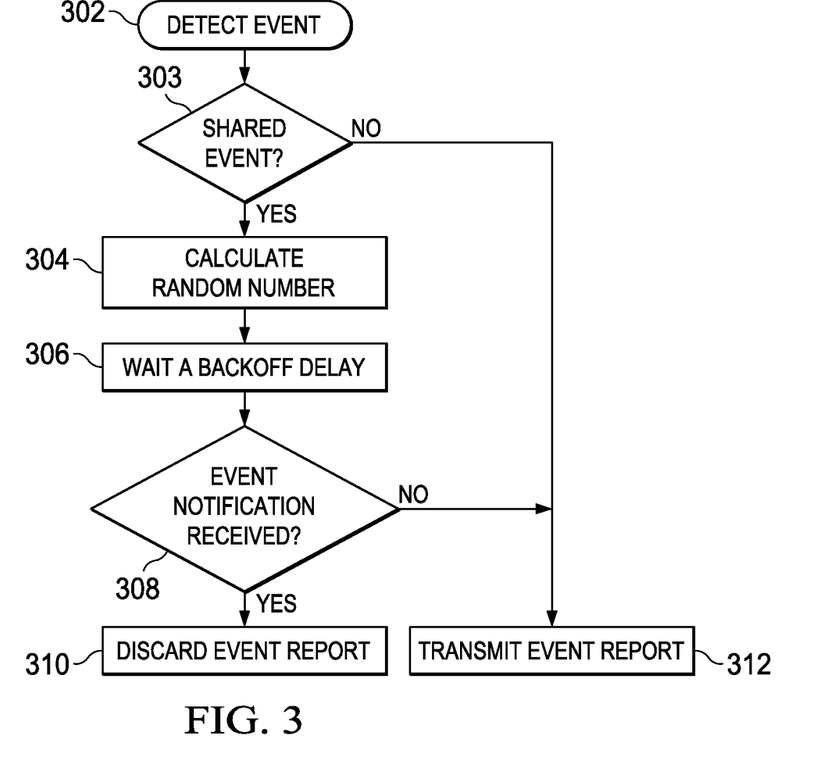
FIG. 3 is a flow chart illustrating steps in a first embodiment.

FIG. 3 illustrates a process for controlling reporting of events in accordance with another embodiment. The process begins in step 302, wherein an event is detected. Upon detecting an event, processing proceeds to step 303, wherein a determination is made whether the event is a shared event. As discussed above, shared events are events that may be reported by two or more M2M devices remotely located, and local events are events that affect a particular M2M device or a relatively few number of M2M devices located within a region. Because local events will be reported only by that particular M2M device, or a relatively few M2M devices, and hence does not unnecessarily burden the network, upon determining in step 303 that the event is a local event, processing proceeds to step 312, wherein an event report corresponding to the local event is transmitted (wired, wirelessly, or hybrid).

If, on the other hand, a determination is made that the event is a shared event (e.g., events that may be detected by multiple M2M devices), processing proceeds to step 304 and a random number is generated. In contrast to the embodiment discussed above with reference to FIG. 2 in which a uniform distribution is used for the random number generator, in this embodiment it may be desirable to utilize a random number generator that utilizes a non-uniform distribution. For example, in an embodiment, the random number is generated according to a cumulative distribution function (CDF), which may be configured or derived from given parameters such as the threshold values used in the previous embodiment. In this manner, the probability is greater near zero than farther from zero. However, this embodiment may utilize a uniform distribution, or other distribution, for the random number generator.

In step 306, the system waits for a backoff delay. In this embodiment, the backoff delay is determined based upon the random number generated in step 304. For example, the random number generated in step 304 may represent a number of a predetermined unit of time that the system is to wait or such number of time units may be calculated from the random number. The predetermined unit of time may be, for example, microseconds, seconds, frames, multiples thereof, or the like. For example, in an embodiment, a CDF may be derived from the threshold values p used in the previous embodiment resulting in $F(t)=1-(1-p)^{t+1}$, where t is the number of delay intervals to queue the event report. This embodiment may first generate a random number x using a random number generator that generates numbers that are uniformly distributed over the interval [0,1). The random number x may then be used to compute $$t = \left\lfloor \frac{\ln(1-x)}{\ln(1-p)} \right\rfloor.$$

After the expiration of the backoff delay, processing proceeds to step 308, wherein a determination is made whether an event notification corresponding to the event has been received. If an event notification corresponding to the event has been received, than the corresponding event report is discarded, as indicated in step 310. Otherwise, the event report is transmitted as indicated in step 312.

Figure 4:
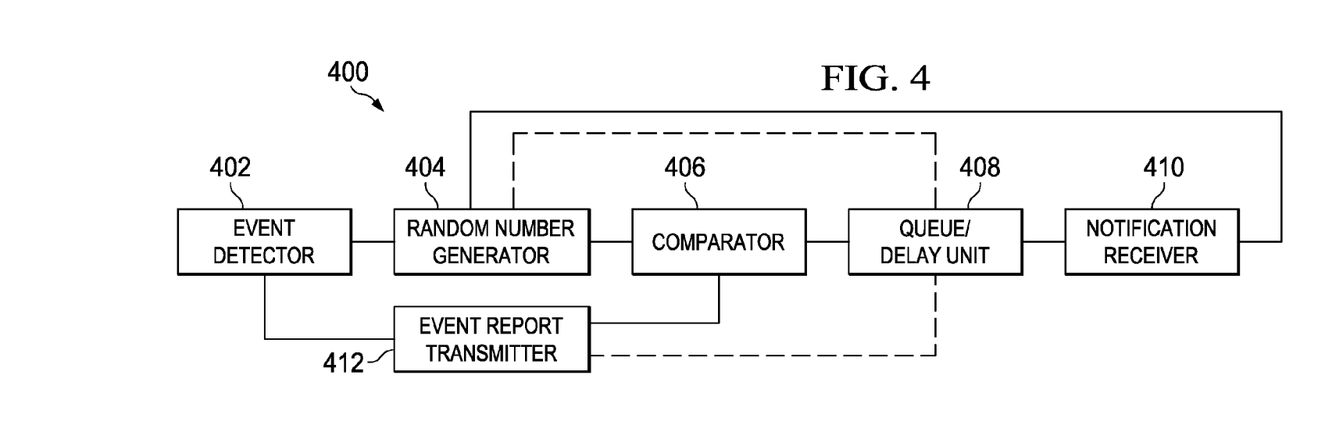
FIG. 4 is a block diagram of a system of an embodiment the present disclosure.

FIG. 4 is a simplified block diagram of an apparatus 400 that may incorporates embodiments of the present disclosure. Referring to this figure, an event detector 402 communicates with a random number generator 404, which in turn communicates with a comparator 406, which communicates with a queue/delay unit 408. A notification receiver 401 communicates with the queue/delay unit 408 and the random number generator 404 to operate as described above. An event indication transmitter 412 communicates with the event detector 402 and to the comparator 406.

This system can be used to perform the method described with respect to FIGS. 2 and 3. It should be noted, however, that depending on the particular embodiment, the connections between the components may vary. For example, as indicated by the dashed lines in FIG. 4, the comparator 406 may not be used and the random number generator 404 may communicate with the queue/delay unit 408. This may be applicable for the embodiment discussed above with reference to FIG. 3, wherein a backoff delay is based upon the random number. As discussed above, in this embodiment, there is no need to compare the random number to a threshold or probability.

Figure 5:
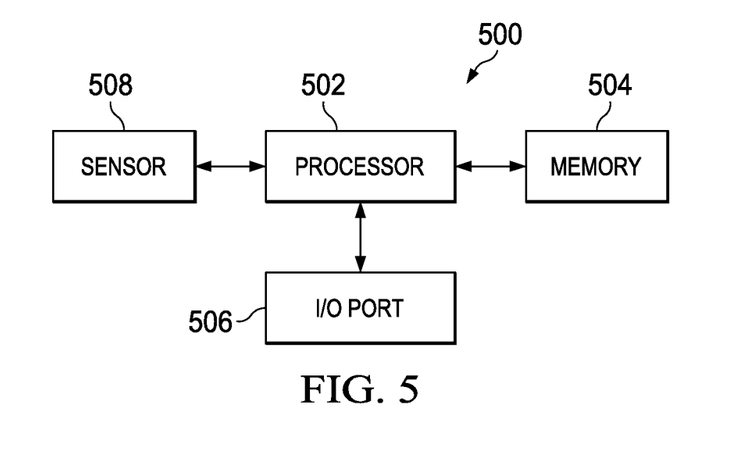
FIG. 5 is a block diagram of one example to implement embodiments of the present disclosure.

FIG. 5 illustrates a processing system that can be utilized to implement methods of the present disclosure such as those discussed above. In this case, the main processing is performed in a processor 502, which can be a microprocessor, digital signal processor or any other appropriate processing device. Program code (e.g., the code implementing the methods disclosed above) and data can be stored in a memory 504 or any other non-transitory storage medium. The memory 504 can be local memory such as DRAM or mass storage such as a hard drive, optical drive or other storage (which may be local or remote). While the memory 504 is illustrated functionally with a single block, it is understood that one or more hardware blocks can be used to implement this function.

In one embodiment, the processor 502 can be used to implement the blocks shown in FIG. 4. For example, the processor 502 can serve as a specific functional unit at different times to implement the subtasks involved in performing the techniques of an embodiment. Alternatively, different hardware blocks (e.g., the same as or different than the processor) can be used to perform different functions. In other embodiments, some subtasks are performed by the processor while others are performed using a separate circuitry.

FIG. 5 also illustrates an I/O port 506, which can be used to provide the data to and from the processor 502. In the case of a wireless (e.g., mobile) device, the I/O port 506 can be coupled to an antenna. In the case of a wired device, the I/O port 506 can be connected to a network interface.

A sensor 508 is also illustrated in FIG. 5. This block is provided to illustrate the source of the event being detected. This can be any type of sensor or other detector, whether operated automatically or manually or both.

Embodiments such as those discussed above may reduce network traffic, particularly during specific events that may cause a high burst rate of traffic, such as a power outage. This is achieved by, among other things, providing proactive congestion handling by delaying the reporting of the event in some of the devices.

Embodiments such as those disclosed herein are applicable to many different transmission technologies. For example, embodiments may be utilized in IEEE 802.11, ZigBee, or the like wireless/wired systems. As known, IEEE 802.11 is a set of standards carrying out wireless local area network (WLAN) computer communication in the 2.4, 3.6 and 5 GHz frequency bands, and ZigBee is a specification for a suite of high level communication protocols using small, low-power digital radios based on the IEEE 802.15.4-2003 standard for Low-Rate Wireless Personal Area Networks (LR-WPANs), such as wireless light switches with lamps, electrical meters with in-home-displays, consumer electronics equipment via short-range radio. While these systems may not explicitly provide an AC congestion control mechanism, embodiments such as those disclosed herein may nevertheless provide congestion control. It should be noted, however, that embodiments such as those disclosed herein may be used in conjunction with a transmission technology's AC congestion control mechanism.

It should also be appreciated that flexibility in parameter (e.g., random number, threshold, backoff delay) selection allows one to "tune" the network to suit a particular application, event, and/or network. Further, flexibility in parameter selection allows support for the prioritization of alarms/urgent traffic. Parameters may be assigned/changed by the system or the device.

Implementation of embodiments of the invention can reduce traffic in network by throttling traffic in the host. Even in the absence of congestion (or detection by network), the algorithm allows for reduction of redundant traffic transmission over the air interface. Embodiments provide more sensitive/rapid reaction to congestion since they do not have to wait for the network to detect congestion and send updated barred access list.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    detecting an event;
    determining whether the event is local or shared, wherein the event being shared comprises the event being a large scale power outage, inclement weather, or a combination thereof;
    when the event is local, reporting the event without queuing;
    when the event is shared, determining whether to queue reporting of the event, wherein determining whether to queue reporting of the event comprises generating a random number and determining whether the random number indicates to queue reporting of the event; and
    upon determining to queue reporting of the event, waiting for a time period and repeating the determining.

2. The method of claim 1, further comprising reporting the event upon determining not to queue reporting of the event.

3. The method of claim 1, further comprising receiving a notification during the time period that the event has been reported.

4. The method of claim 3, further comprising canceling reporting of the event after the receiving the notification that the event has been reported.

5. The method of claim 1, further comprising repeating the waiting after the repeating the determining.

6. The method of claim 1, wherein the event being local comprises the event affecting only a single device.

7. The method of claim 1, further comprising randomly generating the time period.

8. The method of claim 1, further comprising determining the time period in accordance with how many times a reporting of the event has been delayed.

9. A method comprising:
    detecting an event;
    determining whether the event is local or shared, wherein the event being shared comprises the event being a lame scale power outage, inclement weather, or a combination thereof;

when the event is local, reporting the event without waiting; and when the event is shared,
- (a) determining a random number, wherein the random number is based at least in part on a cumulative distribution function (CDF);
- (b) waiting a time period, the time period being based at least in part on the random number;
- (c) after the waiting, determining whether an event notification has been received; and
- (d) upon determining the event notification has not been received, sending an event report corresponding to the event.

10. The method of claim 9, wherein the event being local comprises the event affecting only devices in a single building.

11. The method of claim 9, wherein the random number has a non-uniform distribution.

12. The method of claim 9, wherein the random number represents a number of time units to delay.

13. The method of claim 12, wherein the time units are frames.

14. A system comprising:
- an event detector configured to detect an occurrence of an event and to determine whether the event is local or shared;
- a random number generator coupled to the event detector, and configured to generate a random number when the event is shared;
- a comparator coupled to the random number generator, the comparator configured to compare the random number with a threshold;
- an event report transmitter coupled to the comparator, the event report transmitter configured to send an event report of the event when the event is local, or when the random number is less than the threshold;
- a delay unit coupled to the comparator and configured to delay further processing of the event for a time period when the random number is above the threshold; and
- a notification receiver coupled to the delay unit and configured to receive an event notification from another system, the event notification corresponding to the event,
- wherein the random number generator is coupled to the notification receiver and configured to generate another random number upon being notified by the notification receiver that the event notification corresponding to the event has not been received from another system.

15. The system of claim 14, wherein the comparator is configured to select the threshold based upon a category of the event.

* * * * *

UNITED STATES PATENT AND TRADEMARK OFFICE
CERTIFICATE OF CORRECTION

PATENT NO. : 8,792,341 B2  
APPLICATION NO. : 13/212862  
DATED : July 29, 2014  
INVENTOR(S) : Hanan Ahmed

Page 1 of 1

It is certified that error appears in the above-identified patent and that said Letters Patent is hereby corrected as shown below:

In the Claims:

In Col. 8, line 65, claim 9, delete "lame" and insert --large--

Signed and Sealed this
Twenty-first Day of October, 2014

Michelle K. Lee
*Deputy Director of the United States Patent and Trademark Office*